(12) United States Patent
Asagi et al.

(10) Patent No.: US 9,810,950 B2
(45) Date of Patent: Nov. 7, 2017

(54) METHOD FOR PRODUCING LIQUID CRYSTAL DISPLAY DEVICE WITH FAVORABLE VOLTAGE HOLDING RATIO RELIABILITY AND REDUCED IMAGE STICKING

(71) Applicant: Sharp Kabushiki Kaisha, Sakai, Osaka (JP)

(72) Inventors: Hiroaki Asagi, Sakai (JP); Isamu Miyake, Sakai (JP); Akira Hirai, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/329,660

(22) PCT Filed: Jul. 23, 2015

(86) PCT No.: PCT/JP2015/070900
§ 371 (c)(1),
(2) Date: Jan. 27, 2017

(87) PCT Pub. No.: WO2016/017509
PCT Pub. Date: Feb. 4, 2016

(65) Prior Publication Data
US 2017/0212393 A1    Jul. 27, 2017

(30) Foreign Application Priority Data

Jul. 30, 2014    (JP) .................. 2014-155169

(51) Int. Cl.
*G02F 1/1337*    (2006.01)
(52) U.S. Cl.
CPC .................. *G02F 1/133788* (2013.01); *G02F 2001/133738* (2013.01); *G02F 2001/133749* (2013.01)

(58) Field of Classification Search
CPC ... G02F 1/133788; G02F 2001/133738; G02F 2001/133749; G02F 1/133723;
(Continued)

(56) References Cited

U.S. PATENT DOCUMENTS

| | | | |
|---|---|---|---|
| 2010/0085523 A1* | 4/2010 | Terashita | G02F 1/133711 349/123 |
| 2013/0155362 A1* | 6/2013 | Terashita | G02F 1/133723 349/123 |

(Continued)

FOREIGN PATENT DOCUMENTS

| | | |
|---|---|---|
| JP | 2014-167640 A | 9/2014 |
| JP | 2015-090427 A | 5/2015 |
| WO | 2013/081066 A1 | 6/2013 |

OTHER PUBLICATIONS

Kawatsuki et al., "Molecular-Oriented Photoalignment Layer for Liquid Crystals", Japanese Journal of Applied Physics, vol. 46, No. 1, 2007, pp. 339-341.

*Primary Examiner* — Tracie Y Green
(74) *Attorney, Agent, or Firm* — Keating & Bennett, LLP

(57) ABSTRACT

The present invention provides a method for producing a liquid crystal display device which can produce a liquid crystal display device with favorable voltage holding ratio reliability and reduced image sticking. The method is for producing a liquid crystal display device, which is a horizontal alignment-mode liquid crystal display device including a drive substrate provided with paired electrodes and a counter substrate, the method including: an application step of applying an alignment film material to the surface of each of the drive substrate and the counter substrate; a photo-alignment treatment step of irradiating the applied alignment film material with light; a post-baking step of baking the alignment film material having been subjected to the photo-alignment treatment to form an alignment film on the surface (Continued)

of each of the drive substrate and the counter substrate; and an additional irradiation step of irradiating the alignment films with light, the alignment film material containing a polymer with a (meth)acrylic backbone and a photo-functional group that undergoes a dimerization or cross-linking reaction by photo-irradiation, the additional irradiation step irradiating the alignment film formed on the surface of the counter substrate with an irradiation dose higher than the irradiation dose for the alignment film formed on the surface of the drive substrate.

9 Claims, 2 Drawing Sheets

(58) Field of Classification Search
CPC ... G02F 2001/133757; G02F 1/134363; G02F 1/1337; G02F 2001/133746; G02F 2001/133761; G02F 2203/05
See application file for complete search history.

(56) References Cited

U.S. PATENT DOCUMENTS

2013/0162920 A1* 6/2013 Terashita .......... G02F 1/133723
349/24
2014/0218667 A1 8/2014 Miyachi et al.

\* cited by examiner

METHOD FOR PRODUCING LIQUID CRYSTAL DISPLAY DEVICE WITH FAVORABLE VOLTAGE HOLDING RATIO RELIABILITY AND REDUCED IMAGE STICKING

TECHNICAL FIELD

The present invention relates to methods for producing a liquid crystal display device. More specifically, the present invention relates to a method for producing a liquid crystal display device, including forming an alignment film that controls the alignment of liquid crystal molecules.

BACKGROUND ART

Liquid crystal display devices utilize a liquid crystal composition for display. A typical display method thereof is applying voltage to the liquid crystal composition sealed between paired substrates to change the alignment state of the liquid crystal molecules in the liquid crystal composition according to the applied voltage, thereby controlling the amount of light transmission. These liquid crystal display devices having characteristics such as thin profile, light weight, and low power consumption have been used in a broad range of fields.

The alignment of liquid crystal molecules with no voltage applied is typically controlled by alignment films having been subjected to an alignment treatment. Although rubbing has been a widely used alignment treatment method, photo-alignment methods allowing non-contact alignment treatment have now been studied and developed. Known various photo-alignment methods include photodecomposition, photo-isomerization, and photo-dimerization.

Developed photo-alignment methods include those using a photo-alignment film with an acrylic backbone as the main chain and a photo-functional group such as a cinnamate group in a side chain (for example, Patent Literature 1 and Non Patent Literature 1).

CITATION LIST

Patent Literature

Patent Literature 1: WO 2013/081066

Non Patent Literature

Non Patent Literature 1: Nobuhiro KAWATSUKI, and 4 other persons, "Molecular-Oriented Photoalignment Layer for Liquid Crystals", Japanese Journal of Applied Physics, The Japan Society of Applied Physics, Publication Center for Pure and Applied Physics, 2007, Vol. 46, No. 1, pp. 339-341

SUMMARY OF INVENTION

Technical Problem

The photo-alignment films as described above can provide favorable alignment performance with a very low irradiation dose of several millijoules to several tens of millijoules. However, such photo-alignment films can still be improved considering that they have lower voltage holding ratio (VHR) reliability than conventional polyimide alignment films and are likely to cause display defects such as stains and unevenness. The reasons for the lower VHR reliability of the photo-alignment films are that they do not contain a substance such as amide groups capable of trapping ionic impurities unlike polyimide alignment films, and that the photo-alignment films tend to allow ionic impurities, which may decrease the VHR, to dissolve in the liquid crystal during aging. This tendency is due to single use of the irradiation (irradiation for alignment) in the photo-alignment treatment which makes the photo-crosslinking reaction insufficient, failing to give a dense, high-molecular polymer for the alignment films.

In order to enhance the VHR reliability, techniques of additionally irradiating a photo-alignment film after irradiation for alignment and post-baking have been developed. Patent Literature 1 discloses that additional irradiation stabilizes the alignment. Non Patent Literature 1 reports that additional irradiation results in a slight increase in anchoring energy (see Table 1) and enhancement of thermal stability. The inventors of the present invention, however, have found that additional ultraviolet irradiation decreases the anchoring energy (alignment force) of the alignment film, thereby worsening the image sticking problem. Patent Literature 1 and Non Patent Literature 1 do not mention such a phenomenon.

The present invention has been made in view of the above current state of the art, and aims to provide a method for producing a liquid crystal display device which can produce a liquid crystal display device with favorable voltage holding ratio reliability and reduced image sticking.

Solution to Problem

The inventors of the present invention have made studies on methods for producing a horizontal alignment liquid crystal display device utilizing a photo-alignment method. In the course of the studies, the inventors have focused on production of a photo-alignment film achieving favorable alignment performance from an alignment film material that contains a polymer with a (meth)acrylic backbone and a photo-functional group undergoing a dimerization or cross-linking reaction by photo-irradiation. As a result of further studies on the photo-alignment film, the inventors have found that additional irradiation, though desirable for enhancement of VHR reliability, unfortunately worsens the image sticking problem. To solve this problem, the inventors have tested asymmetrical alignment films in place of symmetrical alignment films having been used for paired substrates (hereinafter, also referred to as "upper and lower substrates") between which a liquid crystal layer is held. Here, the inventors have set the photo-irradiation dose for the alignment film formed on the surface of the counter substrate to be higher than that for the alignment film formed on the surface of the drive substrate. As a result, they have found that such a configuration can achieve both enhanced VHR reliability and reduced image sticking. The inventors have thereby arrived at a solution for the problem, completing the present invention.

One aspect of the present invention may be a method for producing a liquid crystal display device, which is a horizontal alignment-mode liquid crystal display device including a drive substrate provided with paired electrodes and a counter substrate. The method includes: an application step of applying an alignment film material to the surface of each of the drive substrate and the counter substrate; a photo-alignment treatment step of irradiating the applied alignment film material with light; a post-baking step of baking the alignment film material having been subjected to the photo-alignment treatment to form an alignment film on the surface of each of the drive substrate and the counter substrate; and an additional irradiation step of irradiating the alignment films with light. The alignment film material contains a polymer with a (meth)acrylic backbone and a photo-functional group that undergoes a dimerization or cross-linking reaction by photo-irradiation. The additional irradiation step irradiates the alignment film formed on the surface of the counter substrate with an irradiation dose higher than the irradiation dose for the alignment film formed on the surface of the drive substrate.

Patent Literature 1 and Non Patent Literature 1 neither mention nor suggest performing the additional irradiation for only one of the substrates and setting different additional irradiation doses for the substrates.

Advantageous Effects of Invention

The method for producing a liquid crystal display device according to the present invention enables achievement of both favorable VHR reliability and reduced images sticking.

DESCRIPTION OF EMBODIMENTS

Figure 1:
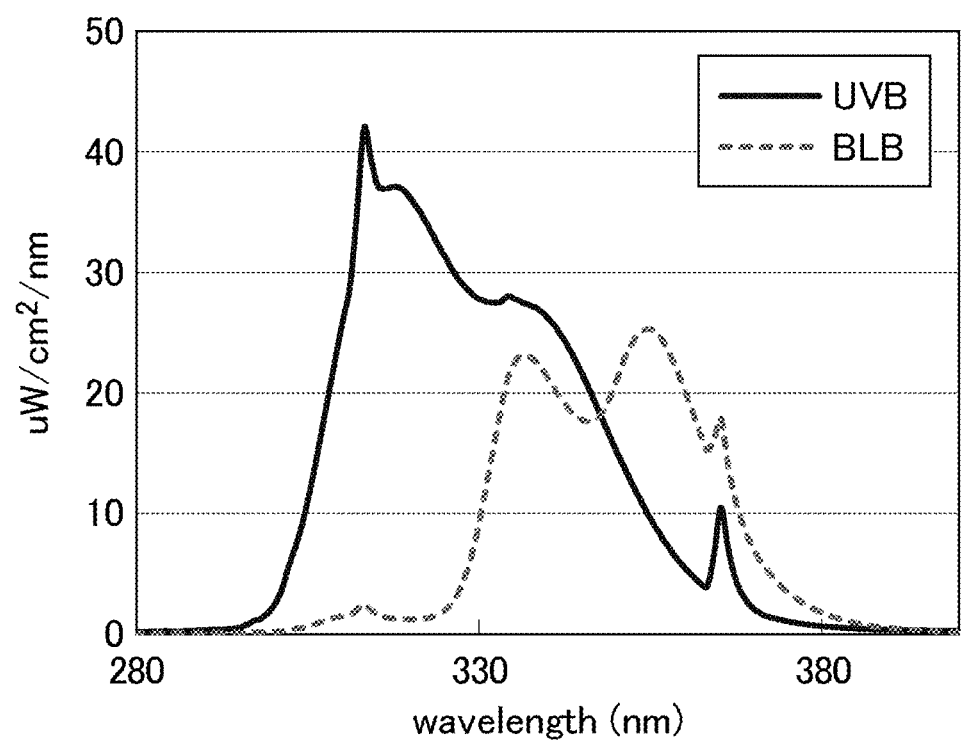
FIG. 1 is a view showing luminescence spectra of an ultraviolet lamp (UVB) used in Examples 1 to 4, 6, and 7, and a black light lamp (BLB) used in Example 5.

Hereinafter, an embodiment of the present invention is described. The embodiment, however, is not intended to limit the scope of the present invention. The present invention may appropriately be modified within the scope of the configuration of the present invention.

A method for producing a liquid crystal display device according to the present embodiment is a method for producing a liquid crystal display device, which is a horizontal alignment-mode liquid crystal display device including a drive substrate provided with paired electrodes and a counter substrate. The method includes: an application step of applying an alignment film material to the surface of each of the drive substrate and the counter substrate; a photo-alignment treatment step of irradiating the applied alignment film material with light; a post-baking step of baking the alignment film material having been subjected to the photo-alignment treatment to form an alignment film on the surface of each of the drive substrate and the counter substrate; and an additional irradiation step of irradiating the alignment films with light. The alignment film material contains a polymer with a (meth)acrylic backbone and a photo-functional group that undergoes a dimerization or cross-linking reaction by photo-irradiation. The additional irradiation step irradiates the alignment film formed on the surface of the counter substrate with an irradiation dose higher than the irradiation dose for the alignment film formed on the surface of the drive substrate.

First, the liquid crystal display device produced by the above production method is described.

The liquid crystal display device is configured to provide display in a horizontal alignment mode. With voltage lower than the threshold voltage applied to the liquid crystal layer held between the drive substrate and the counter substrate (including the case of no voltage application), the liquid crystal display device mainly utilizes the alignment films to align liquid crystal molecules in the liquid crystal layer in parallel with the surface of the drive substrate or counter substrate. The angle of the major axis of each liquid crystal molecule from the surface of the drive substrate or counter substrate is called a "pre-tilt angle". Suitable horizontal alignment modes include the in-plane switching (IPS) mode and the fringe field switching (FFS) mode.

The drive substrate includes paired electrodes. The drive substrate may be, for example, an active matrix substrate (thin-film transistor (TFT) substrate) typically used for a horizontal alignment-mode liquid crystal display device. An active matrix substrate in a plan view may have a configuration including, on a transparent substrate, gate signal lines parallel to each other; source signal lines that extend perpendicularly to the gate signal lines and are parallel to each other; active elements such as thin-film transistors disposed at the respective corresponding intersections of the gate signal lines and the source signal lines; pixel electrodes (one of the paired electrodes) disposed in the respective corresponding regions defined by the gate signal lines and the source signal lines in a matrix form; common lines; and common electrodes (the other of the paired electrodes) connected to the common lines, for example.

The paired electrodes may be, for example, electrodes that can generate electric fields in a direction substantially parallel to the surface of the drive substrate, in the liquid crystal layer held between the drive substrate and the counter substrate. Upon application of voltage by the paired electrodes to the liquid crystal layer, the alignment of the liquid crystal molecules is changed according to the size of the applied voltage. Thereby, the polarization of the polarized light passing through the liquid crystal layer can be controlled. In the case of the IPS mode, paired comb electrodes disposed on the same insulating film are suitable for the above paired electrodes, and these comb electrodes generate horizontal electric fields in the liquid crystal layer. In the case of the FFS mode, a suitable combination for the paired electrodes may be a combination of electrodes with slits disposed as the upper layer of an insulating film and a planar electrode disposed as the lower layer of the insulating film, which generate oblique electric fields in the liquid crystal layer. The material of the paired electrodes may be, for example, a transparent conductive material such as indium tin oxide (ITO) or indium zinc oxide (IZO).

The counter substrate can be a color filter (CF) substrate typically used for horizontal alignment-mode liquid crystal display devices. A color filter substrate may have a configuration including, on a transparent substrate, a black matrix formed in a grid pattern; and color filters formed in the respective grids, i.e., in the respective pixels, for example. Here, the color filters may not be formed in the counter substrate, and both the color filters and the active matrix elements may be provided to the drive substrate.

Examples of the transparent substrate used in each of the drive substrate and the counter substrate include those made of glass such as float glass or soda-lime glass; and those made of a plastic such as polyethylene terephthalate, polybutylene terephthalate, polyether sulfone, polycarbonate, or alicyclic polyolefin.

The drive substrate and the counter substrate are typically attached to each other with a sealant provided to surround the liquid crystal layer, so that the drive substrate, the counter substrate, and the sealant hold the liquid crystal layer in a given region. The sealant can be, for example, an epoxy resin containing inorganic or organic filler and a curing agent. The drive substrate and the counter substrate may each be provided with a polarizing plate (linear polarizer) on the side opposite to the liquid crystal layer. Typical examples of the polarizing plate include those obtained by aligning a dichroic anisotropic material such as an iodine complex adsorbed on a polyvinyl alcohol (PVA) film. Generally, each surface of the PVA film is laminated with a protective film such as a triacetyl cellulose film before the film is put into practical use. An optical film such as a retardation film may be disposed between the polarizing plate and the drive substrate or counter substrate.

The drive substrate and the counter substrate each are provided with an alignment film on the surface. The alignment film may be any horizontal alignment film that aligns liquid crystal molecules in the liquid crystal layer in parallel with the surface of the drive substrate or counter substrate. The alignment film may provide any pre-tilt angle to the molecules. Still, the pre-tilt angle is preferably substantially 0°, which is for example an angle smaller than 10°. The "pre-tilt angle" as used herein refers to the angle of tilt of liquid crystal molecules from the direction parallel to the substrate surface, with the angle direction parallel to the substrate surface being 0° and the angle direction which is the same as the substrate surface normal direction being 90°. In the case of the FFS mode or IPS mode, as the pre-tilt angle becomes closer to 0°, the viewing angle characteristics can be improved.

The liquid crystal display device has a configuration including components such as a liquid crystal display panel; external circuits such as a tape-carrier package (TCP) and a printed circuit board (PCB); optical films such as a viewing angle-increasing film and a luminance-increasing film; a backlight unit; and a bezel (frame). Some components, if appropriate, may be incorporated into another component. In addition to the components described above, the liquid crystal display device may include any components that are usually used in the field of liquid crystal display devices. The additional components are therefore not described here.

Next, the production method is described in detail.

The application step is a step of applying an alignment film material to the surface of each of the drive substrate and the counter substrate. The alignment film material may be one with a (meth)acrylic backbone and a photo-functional group that undergoes a dimerization or cross-linking reaction by photo-irradiation. Such a specific photo-functional group enables provision of favorable alignment performance with a very low irradiation dose of several millijoules to several tens of millijoules. Still, the specific photo-functional group is not likely to achieve the VHR reliability. The method of the present embodiment therefore includes an additional irradiation step to achieve favorable VHR reliability.

The (meth)acrylic backbone may be any structure that contains at least one of an acrylic backbone and a methacrylic backbone. Examples of the structure include one that is formed by polymerization of an acrylic acid ester or methacrylic acid ester and constitutes the main chain of a polymer. Specific examples of the methacrylic backbone include one represented by the following formula (1). A suitable photo-functional group that undergoes a dimerization or cross-linking reaction by photo-irradiation can be at least one group selected from the group consisting of cinnamate, coumarin, chalcone, and cinnamoyl groups. The photo-functional group may be in the main chain or side chain of the polymer.

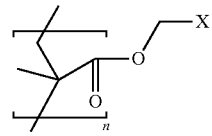

(1)

In the above formula (1), X represents a monovalent organic group, and n represents the number of repeating units which is any integer of 2 or greater.

The alignment film material may contain any other components as needed, and is preferably a solution prepared by dissolving the components in an organic solvent. Examples of the other components include a cross-linking agent (curing agent), a curing catalyst, and a surfactant. The solids concentration of the alignment film material, which in other words is the proportion of the weight of all the components of the alignment film material other than the solvent in the whole weight of the alignment film material, is selected in consideration of the properties such as the viscosity and volatility. Preferably, the solids concentration is in the range of 1 to 10 wt %.

The application method may be, for example, roll coating, spin coating, printing, or ink-jet printing.

The photo-alignment treatment step is a step of irradiating the applied alignment film material with light. Irradiation with light in the photo-alignment treatment step causes a dimerization or cross-linking reaction of the photo-functional groups in the alignment film material, thereby giving a desired pre-tilt angle to the molecules. The light utilized for the photo-alignment treatment can be linearly polarized light or non-polarized light, such as ultraviolet and visible light including light having a wavelength of 150 nm to 800 nm. Still, ultraviolet light including light having a wavelength of 250 nm to 400 nm is preferred. In the case of utilizing linearly polarized light, the material may be irradiated from the direction perpendicular to the substrate surface or an oblique direction to give a pre-tilt angle. The irradiation directions may alternatively be combined. In the case of irradiating the material with non-polarized light, the irradiation direction is an oblique direction. The step can utilize a light source such as a low-pressure mercury lamp, high-pressure mercury lamp, deuterium lamp, metal halide lamp, argon resonance lamp, xenon lamp, or excimer laser. Ultraviolet light having the preferred wavelength can be obtained by a technique of using the above light source in combination with, for example, a filter or a diffraction grating.

The irradiation dose in the photo-alignment treatment is designed such that the polymer material constituting the alignment film is thermally self-organized (re-aligned) sufficiently in the post-baking after the photo-alignment treatment. For this reason, it is difficult to substitute a photo-alignment treatment with an increased irradiation dose for the additional irradiation treatment. The irradiation dose is preferably 0.1 mJ/cm$^2$ to lower than 1000 mJ/cm$^2$, more preferably 1 mJ/cm$^2$ to lower than 100 mJ/cm$^2$. Too high an irradiation dose may inhibit thermal self-organization. Too low an irradiation dose may bring the need for an alignment film material with very high light sensitivity, making a substrate with the alignment film material applied thereto difficult to handle in panel production.

The post-baking step is a step of baking the alignment film material having been subjected to the photo-alignment treatment to form an alignment film on the surface of each of the drive substrate and the counter substrate. The heating temperature in the post-baking step is preferably 90° C. or higher, more preferably 120° C. or higher, while it is preferably 300° C. or lower, more preferably 250° C. or lower. The heating duration for the post-baking step is preferably 5 minutes or longer, more preferably 10 minutes or longer, while it is preferably 120 minutes or shorter, more preferably 60 minutes or shorter. Pre-baking at a temperature lower than that for the post-baking step may precede the post-baking step.

The post-baked alignment film preferably has a thickness of 10 nm or greater, more preferably 40 nm or greater, still more preferably 45 nm or greater, particularly preferably 50 nm or greater, while it preferably has a thickness of 300 nm or smaller, more preferably 150 nm or smaller, still more preferably 145 nm or smaller, particularly preferably 140 nm or smaller.

The additional irradiation step is a step of irradiating the alignment films with light. The light utilized for the additional irradiation can be ultraviolet and visible light including light having a wavelength of 150 nm to 800 nm. In particular, ultraviolet light is preferred, and ultraviolet light including light having a wavelength of 250 nm to 400 nm is suitable. The light source used can be, for example, an ultraviolet lamp (UVB) or a black light lamp (BLB). Differently from the photo-alignment treatment step of giving a pre-tilt angle, the additional irradiation step may irradiate the alignment films with light from any irradiation direction. This point gives an advantage that the additional irradiation is less restrictive about the conditions such as the light source than the photo-alignment treatment. Both linearly polarized light and non-polarized light can be used in the additional irradiation step, but non-polarized light is more suitable for use in terms of simplification of the exposure device. A combination use of polarized light for the photo-alignment treatment and non-polarized light for the additional irradiation is suitable for use, and a combination use of polarized ultraviolet light for the photo-alignment treatment and non-polarized ultraviolet light for the additional irradiation is more suitable for use.

The additional irradiation step irradiates the alignment film formed on the surface of the counter substrate with an irradiation dose higher than the irradiation dose for the alignment film formed on the surface of the drive substrate. Such irradiation doses enable reduction of image sticking as well as enhancement of the VHR reliability. When the irradiation dose for the counter substrate side is increased and the irradiation dose for the drive substrate side is decreased, the cross-linking degree of the photo-alignment film on the counter substrate side can be made higher than the cross-linking degree of the photo-alignment film on the drive substrate side. The irradiation mode for the additional irradiation step is preferably one with an irradiation dose for the drive substrate side of 20 mJ/cm$^2$ or lower, more preferably one with irradiation only for the counter substrate side and no irradiation for the drive substrate side. The irradiation mode is preferably one with an irradiation dose for the counter substrate side of 20 mJ/cm$^2$ or higher, more preferably 100 mJ/cm$^2$ or higher.

The photo-irradiation in the additional irradiation step may be performed on the entire surface of each alignment film, and is preferably performed at least on the display region of the liquid crystal display device in which pixels are arranged. Also, in order to prevent degradation of the liquid crystal material in the additional irradiation step, the additional irradiation is preferably performed before the liquid crystal material is put on the alignment films. Although photo-irradiation is sometimes performed for curing a sealant that seals the liquid crystal material between the drive substrate and the counter substrate, it is difficult to perform the additional irradiation step by such photo-irradiation for curing the sealant for the above reason.

The method for producing a liquid crystal display device according to the present embodiment may be any method that includes at least the application step, the photo-alignment treatment step, the post-baking step, and the additional irradiation step, and may include any other step(s). For example, the method may include a drying step between the application step and the photo-alignment treatment step.

Each and every detail described for the above embodiment of the present invention shall be applied to all the aspects of the present invention.

The present invention is described below in more detail based on examples and comparative examples. The examples, however, are not intended to limit the scope of the present invention.

Example 1

A TFT substrate (drive substrate) including components such as TFTs and FFS electrode structures on a glass substrate was prepared. Each TFT included a channel formed by an oxide semiconductor, indium gallium zinc oxide (IGZO). Each FFS electrode structure had an electrode width L of 3 μm and an electrode space S of 5 μm. The pixel electrode constituting each FFS electrode structure was a transparent electrode made of ITO. Also, a CF substrate (counter substrate) including a black matrix, color filters, and photo-spacers on a glass substrate was prepared. The photo-spacers had a height of 3.5 μm.

An alignment film solution was applied to the surface of each of the TFT substrate and the CF substrate. The solids content of the alignment film solution was a polymer material with a methacrylic backbone (main chain) and cinnamate groups in side chains of the backbone. The chemical structure of the solids content was represented by the following formula (2). The solids content represented by the following formula (2) used in the present example was a material with a cinnamate group in every side chain. This solids content may also include copolymerized units with methacrylic acid without photo-functional groups. The solvent of the alignment film solution was an equal mixture of N-methyl-2-pyrrolidone and ethylene glycol monobutyl ether. The solids concentration of the alignment film solution was 5 wt %.

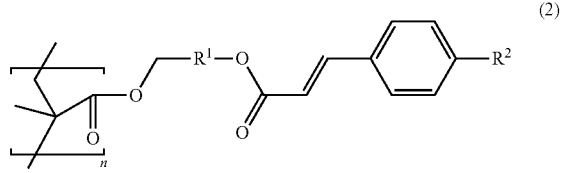

(2)

In the above formula (2), $R^1$ represents a single bond or a divalent organic group, $R^2$ represents a hydrogen atom, a fluorine atom, or a monovalent organic group, and n represents the number of repeating units which is any integer of 2 or greater.

After the application of the alignment film solution, the TFT substrate and the CF substrate were temporarily dried (pre-baked) at 70° C. for 2 minutes. Subsequently, the photo-alignment treatment was performed by irradiating the temporarily dried surface of each of the TFT substrate and the CF substrate from the substrate normal direction with linearly polarized ultraviolet light having a wavelength of 313 nm with an irradiation intensity of 5 mJ/cm$^2$.

The post-baking was then performed by heating the TFT substrate and the CF substrate at 140° C. for 30 minutes. The post-baked alignment films each had a thickness of about 100 nm.

The post-baking was followed by irradiation of only the alignment film formed on the CF substrate side with non-polarized ultraviolet light emitted by an ultraviolet lamp (UVB) with a dose of 200 mJ/cm$^2$, without additional irradiation treatment for the alignment film formed on the TFT substrate side.

On the TFT substrate, a heat/visible light-curable sealant (Kyoritsu Chemical & Co., Ltd., trade name: World Rock) was poured with a dispenser. The TFT substrate and the CF substrate were then attached to each other with positive liquid crystal having positive anisotropy of dielectric constant in between while the polarization directions of ultraviolet light radiated in the photo-alignment treatment were adjusted to be parallel to each other. With the display region of the attached substrates shielded from light by a mask, the sealant was cured by being irradiated with light from which components with a wavelength of 380 nm or shorter were removed. The intensity of the light for curing the sealant was 10 J/cm$^2$ at a wavelength of 405 nm.

The workpiece was heated at 130° C. for 40 minutes, so that the liquid crystal molecules were re-aligned. Thereby, a FFS-mode liquid crystal display panel in which the liquid crystal molecules were uniformly uniaxially aligned was produced.

Examples 2 to 7, Comparative Examples 1 to 3

An FFS liquid crystal panel was produced by the same procedure as that in Example 1 except that the conditions of the additional irradiation treatment were changed as follows.

In Example 2, the irradiation dose was reduced to 100 mJ/cm$^2$.

In Examples 3 and 4, the additional irradiation treatment was performed for the alignment film on the TFT substrate side as well, with a higher irradiation dose for the alignment film on the CF substrate side than for the alignment film on the TFT substrate side.

In Example 5, the light source was changed to a black light lamp (BLB). FIG. 1 is a view showing the luminescence spectra of the ultraviolet lamp (UVB) used in Examples 1 to 4, 6, and 7, and the black light lamp (BLB) used in Example 5.

In Example 6, the light was changed to linearly polarized ultraviolet light emitted by the ultraviolet light lamp (UVB).

In Example 7, the irradiation dose was low (20 mJ/cm$^2$).

In Comparative Example 1, the additional irradiation treatment was not performed.

In Comparative Example 2, the additional irradiation treatment was performed for the alignment film on the TFT substrate side as well, with equal irradiation doses for the alignment films on the TFT substrate side and the CF substrate side (200 mJ/cm$^2$).

In Comparative Example 3, the additional irradiation treatment was performed for the alignment film on the TFT substrate side as well, with equal reduced irradiation doses for the alignment films on the TFT substrate side and the CF substrate side (100 mJ/cm$^2$).

As shown in FIG. 1, although both UVB and BLB emit light with a wavelength of 300 nm to 400 nm, UVB emits light with a shorter wavelength. Since the light from UVB has a peak wavelength near the absorption wavelength (313 nm) of the cinnamate groups which are photosensitive groups, UVB can enhance VHR with a lower irradiation dose and shorter irradiation duration than BLB. UVB, however, is more likely to cause image sticking, and thus requires more precise process management than BLB.

(Evaluation Test)

The FFS liquid crystal panels produced in Examples 1 to 7 and Comparative Examples 1 to 3 were subjected to the following evaluation tests.

(1) VHR Reliability

The panels were subjected to an aging test while being charged with a 5-V current at 60° C. The VHR of each panel after 500 hours was measured.

The results were evaluated based on the following criteria.
Excellent: VHR was 97% or higher.
Good: VHR was 95% to lower than 97%.
Poor: VHR was lower than 95%.

(2) Image Sticking

The panels were each set to display a black and white checkerboard pattern for 24 hours, and then to display a 32-grayscale image on the entire screen. The displayed state of the 32-grayscale image was visually checked for evaluation of the image sticking level.

The results were evaluated based on the following criteria.
Excellent: No image sticking was observed with the naked eye.
Good: Image sticking was observed with the naked eye, but no image sticking was observed through a neutral density filter ND-20 (average transmittance: 20%).
Poor: Image sticking was observed through a neutral density filter ND-10 (average transmittance: 10%), but no image sticking was observed through a neutral density filter ND-8 (average transmittance: 8%).

The following Table 1 shows the photo-irradiation doses and the results of evaluation tests in the examples and comparative examples.

TABLE 1

| | Additional irradiation treatment (unit: mJ/cm$^2$) | | Panel characteristics | |
| --- | --- | --- | --- | --- |
| | TFT substrate side | CF substrate side | VHR | AC image sticking |
| Example 1 | Not performed | 200 | Excellent | Excellent |
| Example 2 | Not performed | 100 | Excellent | Excellent |
| Example 3 | 20 | 200 | Excellent | Good |
| Example 4 | 20 | 100 | Excellent | Good |
| Example 5 | Not performed | 100 | Excellent | Excellent |
| Example 6 | Not performed | 100 | Excellent | Excellent |
| Example 7 | Not performed | 20 | Good | Excellent |
| Comparative Example 1 | Not performed | Not performed | Poor | Excellent |
| Comparative Example 2 | 200 | 200 | Excellent | Poor |
| Comparative Example 3 | 100 | 100 | Excellent | Poor |

As shown in Table 1, Examples 1 to 7 each achieved a VHR of 95% or higher and caused no image sticking in observation through a neutral density filter ND-20 (average transmittance: 20%). This means that the methods of these examples achieved both favorable VHR reliability and favorably reduced image sticking.

In contrast, Comparative Example 1 did not cause image sticking in the naked eye observation in the 24-hour image sticking test, but showed a VHR after the 500-hour aging test of lower than 95% and had stains around the sealant. These results show that no additional irradiation treatment leads to poor reliability.

Comparative Examples 2 and 3 achieved a VHR after the 500-hour aging test of 97% or higher without defects such as unevenness or stains, but caused image sticking even in observation through a neutral density filter ND-10 (average transmittance: 10%) after the 24-hour image sticking test. These results show that additional irradiation treatment for the alignment films on the TFT substrate side and the CF substrate side with a dose of 100 mJ/cm$^2$ or higher results in significantly increased image sticking.

Comparison between Examples 1 to 7 and Comparative Examples 1 to 3 suggests that the additional irradiation dose for the CF substrate side needs to be higher than that for the TFT substrate side in order to achieve favorably reduced image sticking (evaluation result of Excellent or Good) and favorable VHR reliability (evaluation result of Excellent or Good). The comparison also suggests that the additional irradiation dose for the CF substrate side is preferably 100 mJ/cm$^2$ or higher, for achievement of particularly favorable VHR reliability (evaluation of Excellent).

In addition, the evaluation results suggest the following points.

Comparison between Example 1 and Example 3 or comparison between Example 2 and Example 4 shows that a method without additional irradiation for the TFT substrate side can achieve VHR reliability equivalent to that achieved by a method with irradiation for the TFT substrate side with a dose of 20 mJ/cm$^2$. Also, since the method with no additional irradiation for the TFT substrate side provides more favorably reduced image sticking than the method with irradiation for the TFT substrate side with a dose of 20 mJ/cm$^2$, the optimal method is one including additional irradiation only for the CF substrate side but excluding additional irradiation for the TFT substrate side.

The light source used in additional irradiation is not limited to UVB, and the same effects can be achieved with BLB.

The light used in additional irradiation is not limited to non-polarized light, and the same effects can be achieved with polarized light.

(Summary of the Effects)

The following gives supplementary description of the effects achieved by the methods for producing a liquid crystal display device described in the embodiment and examples.

(1) VHR Reliability

Without additional irradiation, the alignment films fail to be a dense, high-molecular polymer layer. Hence, low molecular weight components in the alignment film and ionic impurities such as impurity components generated from the substrates tend to be released to the liquid crystal layer during long-term aging, turning into mobile ions which can decrease the VHR. In contrast, additional irradiation causes dimerization of cinnamate groups, which causes a cross-linking reaction of low molecular weight components in the alignment films with the alignment film polymer. This reaction prevents the low molecular weight components from being released to the liquid crystal layer. Also, since the photo-functional groups having failed to react in the photo-alignment treatment undergo a dimerization reaction (cross-linking reaction), the alignment film polymer gives a dense, high molecular polymer layer. This reaction prevents impurity components generated from the substrates from being released to the liquid crystal layer. These effects enable prevention of display defects such as unevenness and stains during long-term use.

(2) Image Sticking

While additional irradiation of the substrates on which photo-alignment films have been formed (after the application, temporal drying, exposure, and post-baking) enhances the reliability, the additional irradiation can also increase image sticking. The image sticking is increased presumably because as the dimerization or cross-linking reaction of the alignment film polymer proceeds, the anchoring energies of the alignment films decrease, so that the alignment of the liquid crystal molecules with voltage applied tends to be fixed to the azimuth direction in the substrate plane (in-plane direction). It has therefore been difficult to achieve both use of a sufficient irradiation dose to prevent a decrease in VHR and prevention of image sticking. The present invention can achieve both of these by optimizing the additional irradiation conditions for each of the upper and lower substrates.

(3) Advantage of Asymmetrical Configurations of Upper and Lower Substrates

Figure 2:
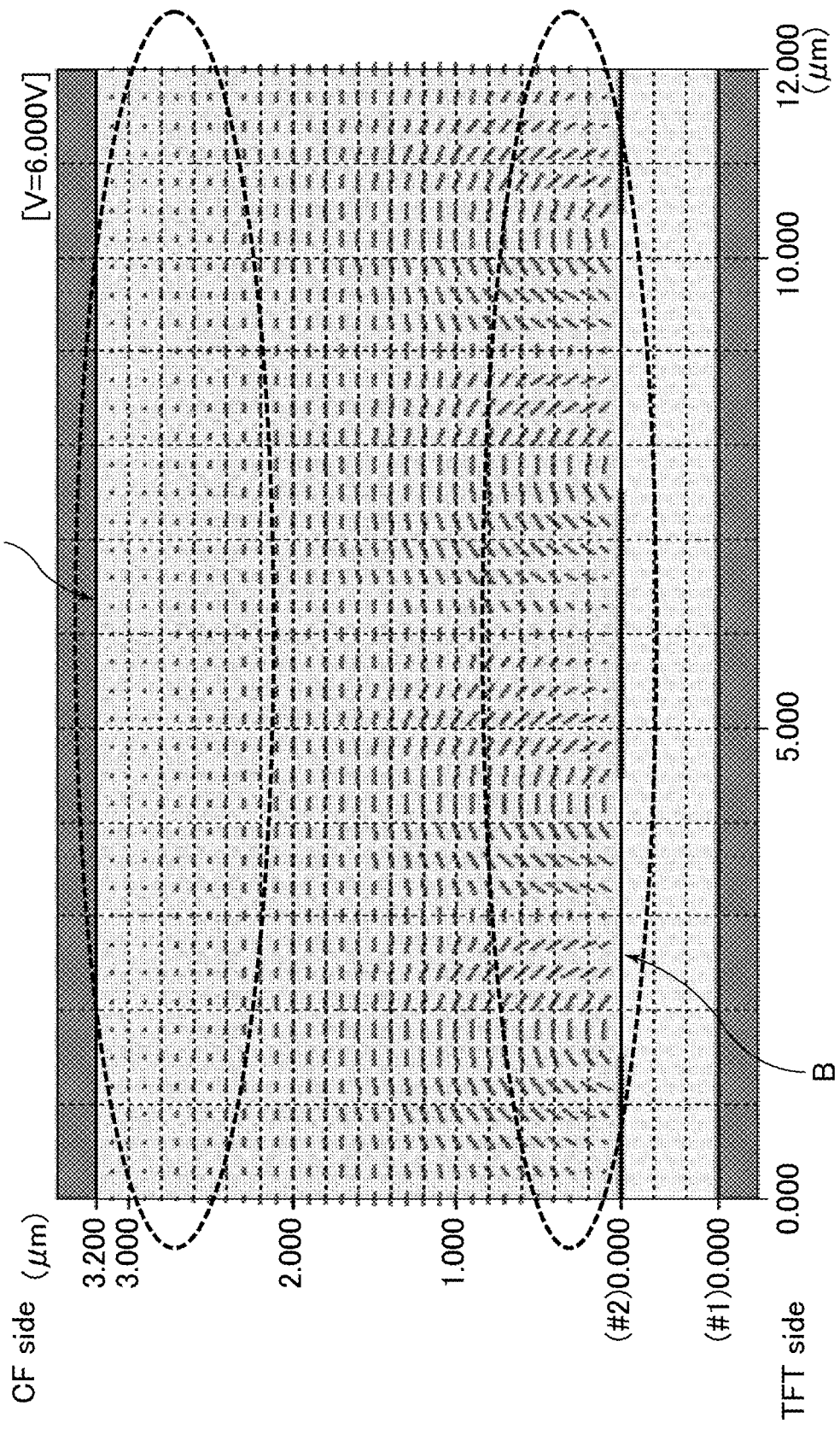
FIG. 2 is a view showing the calculation results of distribution of liquid crystal molecule alignments in a liquid crystal layer in an FFS mode.

In order to study the electric field distribution (molecular alignment) with electric fields generated in a horizontal alignment mode, the molecular alignment with voltage applied in the FFS mode was calculated under the following conditions with LCDMaster available from Shintech, Inc. The results are shown in FIG. 2.

[Simulation Conditions]

Angle formed by extension direction of electrode slits and initial alignment direction of liquid crystal=7°

Electrode width/electrode slit width (L/S) of pixel electrode=3 µm/5 µm

Thickness of liquid crystal layer=3.2 µm

Voltage applied=6 V

Kind of liquid crystal: positive liquid crystal

FIG. 2 is a view showing the calculation results of distribution of liquid crystal molecule alignments in a liquid crystal layer in an FFS mode. The reference sign #1 in the vertical axis of FIG. 2 represents the position of the planar lower electrode, and the reference sign #2 represents the position of the pixel electrodes with electrode slits. An insulating film is placed between the positions #1 and #2, and a liquid crystal layer is arranged on and above the position #2. In FIG. 2, the alignments of liquid crystal molecules in the liquid crystal layer are indicated by the orientations and lengths of the lines representing the liquid crystal molecules.

A horizontal alignment-mode liquid crystal display device with voltage applied rotates liquid crystal molecules in the in-plane direction to provide white display. FIG. 2 shows that liquid crystal molecules are more dynamically rotated on the TFT substrate side (region B in FIG. 2) than on the CF substrates side (region A in FIG. 2). This means that the image sticking in a horizontal alignment mode is highly susceptible to the anchoring energy (alignment force) of the TFT substrate than that of the CF substrate. Thus, a liquid crystal display device with both favorable VHR reliability and reduced image sticking can be produced by performing additional irradiation for the CF substrate side to increase the photo cross-linking degree for reliability enhancement while performing no or low-dose additional irradiation for the TFT substrate side for prevention of an increase in image sticking.

[Additional Remarks]

The above embodiment and examples lead to the following modes of the present invention. The modes may appropriately be combined with each other within the spirit of the present invention.

One mode of the present invention may be a method for producing a liquid crystal display device, which is a horizontal alignment-mode liquid crystal display device including a drive substrate provided with paired electrodes and a counter substrate. The method includes: an application step of applying an alignment film material to the surface of each of the drive substrate and the counter substrate; a photo-alignment treatment step of irradiating the applied alignment film material with light; a post-baking step of baking the alignment film material having been subjected to the photo-alignment treatment to form an alignment film on the surface of each of the drive substrate and the counter substrate; and an additional irradiation step of irradiating the alignment films with light. The alignment film material contains a polymer with a (meth)acrylic backbone and a photo-functional group that undergoes a dimerization or cross-linking reaction by photo-irradiation. The additional irradiation step irradiates the alignment film formed on the surface of the counter substrate with an irradiation dose higher than the irradiation dose for the alignment film formed on the surface of the drive substrate. The method for producing a liquid crystal display device according to the present mode enables production of a liquid crystal display device that achieves both favorable VHR reliability and reduced image sticking.

In the additional irradiation step, the irradiation dose for the alignment film formed on the surface of the drive substrate is preferably 20 mJ/cm$^2$ or lower. More preferably, the additional irradiation step irradiates only the alignment film formed on the surface of the counter substrate with light. This mode enables further reduction of image sticking while maintaining the VHR reliability.

In the additional irradiation step, the irradiation dose for the alignment film formed on the surface of the counter substrate is preferably 20 mJ/cm$^2$ or higher, more preferably 100 mJ/cm$^2$ or higher. This mode can give particularly favorable VHR reliability.

The light radiated in the additional irradiation step may be ultraviolet light. This mode can achieve the effects of the additional irradiation sufficiently.

The photo-functional group may be at least one group selected from the group consisting of cinnamate, coumarin, chalcone, and cinnamoyl groups. With this mode, the additional irradiation may be particularly effective.

The alignment films may give a pre-tilt angle of substantially 0° to liquid crystal molecules. With this mode, the additional irradiation may be particularly effective.

The horizontal alignment mode may be an IPS mode or an FFS mode. With this mode, the additional irradiation may be particularly effective.

The invention claimed is:

1. A method for producing a liquid crystal display device, which is a horizontal alignment-mode liquid crystal display device including a drive substrate provided with paired electrodes and a counter substrate,
the method comprising:
an application step of applying an alignment film material to the surface of each of the drive substrate and the counter substrate;
a photo-alignment treatment step of irradiating the applied alignment film material with light;
a post-baking step of baking the alignment film material having been subjected to the photo-alignment treatment to form an alignment film on the surface of each of the drive substrate and the counter substrate; and
an additional irradiation step of irradiating the alignment films with light,
the alignment film material containing a polymer with a (meth)acrylic backbone and a photo-functional group that undergoes a dimerization or cross-linking reaction by photo-irradiation,
the additional irradiation step irradiating the alignment film formed on the surface of the counter substrate with an irradiation dose higher than the irradiation dose for the alignment film formed on the surface of the drive substrate.

2. The method for producing a liquid crystal display device according to claim 1,
wherein in the additional irradiation step, the irradiation dose for the alignment film formed on the surface of the drive substrate is 20 mJ/cm$^2$ or lower.

3. The method for producing a liquid crystal display device according to claim 2,
wherein the additional irradiation step irradiates only the alignment film formed on the surface of the counter substrate with light.

4. The method for producing a liquid crystal display device according to claim 1,
wherein in the additional irradiation step, the irradiation dose for the alignment film formed on the surface of the counter substrate is 20 mJ/cm$^2$ or higher.

5. The method for producing a liquid crystal display device according to claim 4,
wherein in the additional irradiation step, the irradiation dose for the alignment film formed on the surface of the counter substrate is 100 mJ/cm$^2$ or higher.

6. The method for producing a liquid crystal display device according to claim 1,
wherein the light radiated in the additional irradiation step is ultraviolet light.

7. The method for producing a liquid crystal display device according to claim 1,
wherein the photo-functional group is at least one group selected from the group consisting of cinnamate, coumarin, chalcone, and cinnamoyl groups.

8. The method for producing a liquid crystal display device according to claim 1,
wherein the alignment films give a pre-tilt angle of substantially 0° to liquid crystal molecules.

9. The method for producing a liquid crystal display device according to claim 1,
wherein the horizontal alignment mode is an IPS mode or an FFS mode.

* * * * *